UNITED STATES PATENT OFFICE.

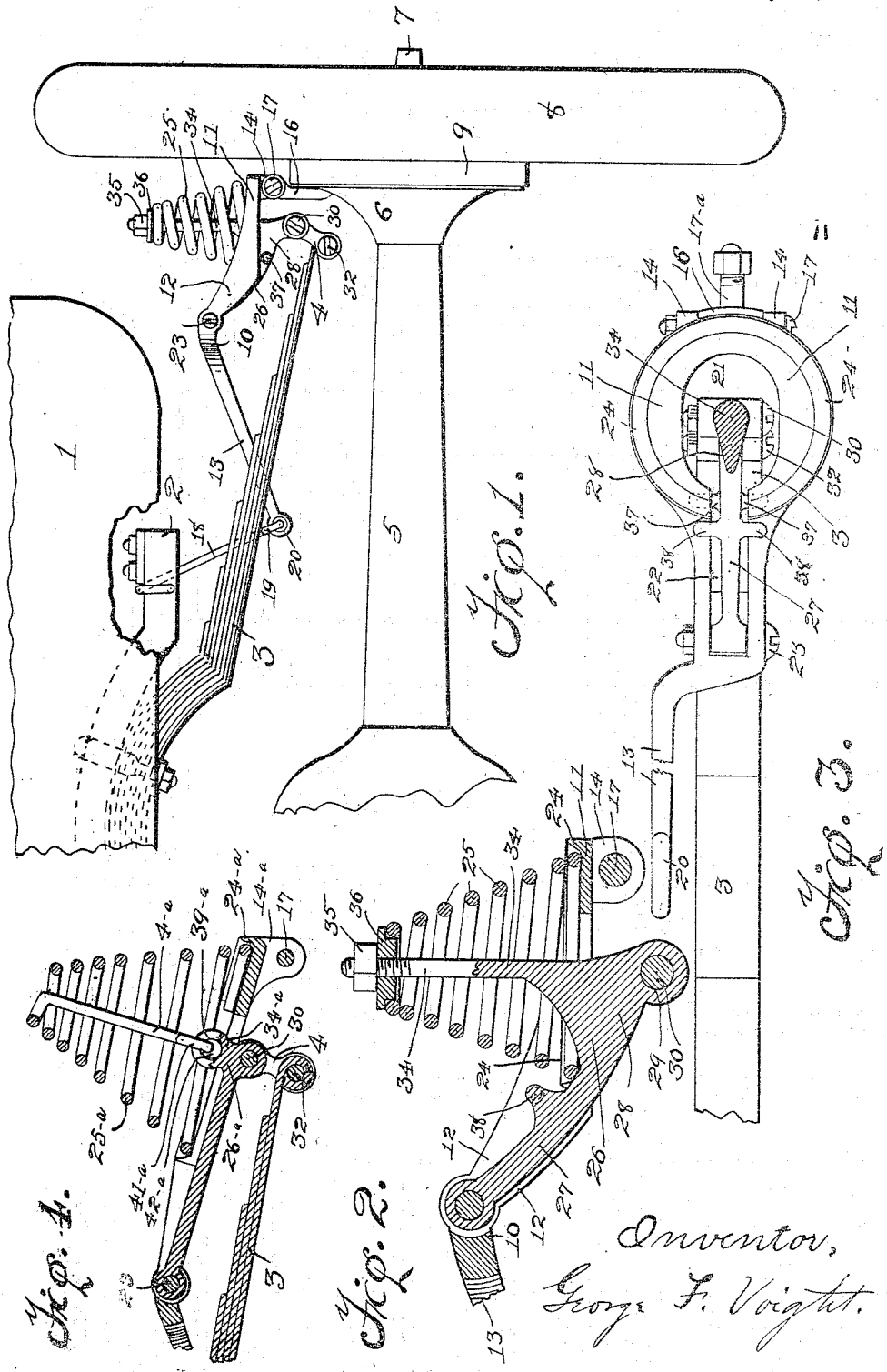

GEORGE F. VOIGHT, OF SAN FRANCISCO, CALIFORNIA.

SPRING SUSPENSION FOR ROAD-VEHICLES.

1,267,609.　　　　Specification of Letters Patent.　　Patented May 28, 1918.

Application filed March 19, 1917.　Serial No. 155,778.

*To all whom it may concern:*

Be it known that I, GEORGE F. VOIGHT, a citizen of the United States, residing at San Francisco, in the county of San Francisco and State of California, have invented a new and useful Spring Suspension for Road-Vehicles, of which the following is a specification.

My invention relates to a spring suspension for road vehicles in which an auxiliary spring operates in conjunction with a principal leaf spring.

An object of my invention is to provide an auxiliary spring for assisting the principal leaf spring to cushion the vehicle against the unevenness of the road; another object being to provide such an auxiliary spring and a connecting means between it and one end of the principal leaf spring whereby the former spring yieldingly and movably supports the latter spring and at the same time permits only a limited endwise movement, or end-wise swaying, of the principal spring, and also to eliminate all sliding bearings for guiding said connecting means in its upward and downward movements with the upward and downward movements of the auxiliary spring.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:

Figure 1 is a rear end elevation of the right-hand side of an automobile, and a rear side view of my invention applied thereto.

Fig. 2 is a vertical rear side sectional view of a portion of the invention detached from the vehicle.

Fig. 3 is a top view of the invention, certain parts being removed and a portion being shown in section, the view also showing a portion of the principal leaf spring of the vehicle.

Fig. 4 is a vertical rear side sectional view of the invention in a modified form, a portion being broken away, this figure also shows a sectional side view of a portion of the principal leaf spring.

Like numerals refer to like parts throughout the several views.

Referring to the drawings,—

1 designates the body, 2 the frame, 3 the principal leaf spring, 4 the spring shackle, 5 the axle housing, 6 the axle housing flange, 7 the axle, 8 the wheel, and 9 the brake drum, of an automobile. (The axle housing 5, flange 6 and the axle 7, assembled as shown in Fig. 1, will be referred to from time to time in the claims as the axle-assembly).

10 designates an oscillatory lever having an outer enlarged circular section 11, an intermediate section 12, and an inner arm section 13. Upon the lower side of the enlarged section 12 adjacent its periphery, are disposed two depending ears 14, which are provided with suitable transverse openings 15, which openings register with an opening extending through the upper end of a supporting bracket 16, into which openings is fitted a suitable pivot bolt 17. The bracket has a lower outwardly extending threaded portion 17$^a$ fitted into a suitable horizontal opening in the flange 6, to which flange the bracket is rigidly secured. The enlarged section 11 and the intermediate section 12, overhang the outer end of the principal leaf spring, while the inner arm section 13 is bent to one side of the spring so as to be free to move upward and downward alongside of the principal leaf spring. The inner end of the lever 10 is supported by the main body portion of the automobile, by means of a connecting rod 18, which rod has a hook-eye 19 at its lower end hooking with the eye 20 at the inner end of the arm 13, while the upper end of the rod 18 is formed into a kind of yoke, which yoke straddles a portion of the frame 2 from the upper side thereof. The lower end of the connecting rod 18 has a transverse oscillatory movement relative to the frame 2, so as to permit of a certain transverse swaying or movement of the automobile body relative to the lever 10. The enlarged circular section 11 is provided with a relatively large central opening 21 connecting with a longitudinal slot 22 extending vertically through the intermediate section 12. The inner end of the section 12, at the end of the slot 22, is provided with a horizontal opening fitted with a pivot bolt 23. The upper side of the enlarged section 11, is provided with an annular upstanding rim 24 adjacent its periphery, which forms a seat for a spiral auxiliary spring 25. A portion of the rim 24 is cut away by the slot 22. Into the opening 21 and the slot 22, is disposed a spring hanger 26, which hanger has a radius arm 27 having its free end pivotedly connected to the lever 10 by means of the pivot bolt 17, a main section 28 provided with an opening 29 for the reception of the upper pivot pin 30 of a conventional spring shackle 4, the lower end of the shackle being pivotedly connected to the outer end of the principal leaf spring by means of the lower pivot pin 32 engaging an eye in said end of the spring, and an upstanding section 34 extending vertically into the longitudinal opening through the spiral spring 25. The upper end of the upstanding section 34 is threaded and fitted with a nut 35. Seated upon the upper end of the spiral spring 25 is a washer 36 provided with a central opening for the reception of the said threaded end of the upstanding section 34.

By means of the connection 4 and the hanger 26, the auxiliary spiral spring 25 yieldingly supports the outer end of the principal leaf spring 3.

The hanger 26 is rotatable upon the pivot bolt 17, and the function of the radius arm 27 is to prevent undue side movement of the lower portion of the upstanding section 34, and also to limit the endwise movement of the principal leaf spring.

By turning the nut 35 in the proper direction, the hanger 26 can be either raised or lowered relative to the spring 25.

Upon the sides of the hanger 26, below the lever 10, are disposed two oppositely extending trunnions 37 engageable with the lower side of the lever 10 for limiting the upward movement of the hanger, and upon the said sides, but above said portions of the lever, are two oppositely disposed trunnions 38 engageable with the upper side of the lever 10 for limiting the downward movement of the hanger.

In the modification shown in Fig. 4, the upstanding section 34ª is relatively short and formed with an eye 39ª, and the upper end of the spring 25ª is turned downwardly into the longitudinal opening in the said spring, forming a connecting shaft 40ª, the lower end of which shaft is provided with a hook-eye 41ª, which hook-eye is coupled up with the eye 42ª in the upstanding section 34ª.

It is to be understood that I do not desire to strictly limit myself to the particular kind of connection between the inner end of the lever and the vehicle frame, shown in my drawings, nor as to the particular point of connection with the vehicle; and if so desired, the connection can be made between the inner end of the lever and a suitable portion of the principal leaf spring a suitable distance inwardly from its end, or it can be made with any other suitable portion of the vehicle frame. And it is to be further understood that although I have shown in the drawings the invention assembled with the right-hand rear portion of an automobile, it is applicable to the left-hand as well as to the right-hand side, and to the front as well as to the rear end of the machine.

I claim:—

1. In a device of the nature described, a lever, a spring hanger having one end pivotally supported by the lever, the free end of said hanger being resiliently supported by an auxiliary spring carried by the lever, and a connection between said free end of said hanger and one end of the principal leaf spring.

2. In a device of the nature described, a lever, a spring hanger having one end connected to the lever, the free end of the hanger being resiliently supported by an auxiliary spring carried by the lever intermediate its ends, and a connection between the free end of said hanger and one end of the principal leaf spring.

3. In a device of the nature described, a lever, a spring hanger having one end jointed to the lever, a spiral compression spring seated upon the lever intermediate its ends, the free end of the hanger being supported by said spring, and a connection between the hanger adjacent its free end and one end of the principal leaf spring.

4. In a device of the nature described, a lever, a spring hanger having one end pivotally supported by the lever, a spiral compression spring seated upon the lever intermediate its ends, a connection between the free end of said hanger and the upper or free portion of said spring so that the latter spring may resiliently support said free end of said hanger, and a connection between said hanger adjacent its free end and one end of the principal leaf spring.

5. In a device of the nature described, a lever, a spring hanger, a connection between one end of said hanger and the lever, a spiral compression spring seated upon the lever intermediate its ends, a connection between the other end of said hanger and said spring so that said last mentioned end of said hanger may move downward against the tension of said spring, and a connection between said second mentioned end of said hanger and one end of the principal leaf spring.

6. In a device of the nature described, a lever, a spring hanger, a connection between one end of the said hanger and the lever, a spiral compression spring seated upon the lever intermediate its ends, said hanger having an upstanding arm adjacent its free end, a connection between said upstanding arm and said spring, the arrangement being such that said free end of said hanger may move downward against the tension of said spring, and a connection between said free end of said hanger and one end of the principal leaf spring.

7. In a device of the nature described, a lever, a spring hanger, a connection between one end of said hanger and the lever, a spiral spring carried by the lever intermediate its ends, said hanger having an upstanding arm adjacent its free end, a connection between said upstanding arm and said spiral spring, the arrangement being such that said free end of said hanger may be moved downward against the tension of said spiral spring, and a connection between said hanger adjacent its free end and one end of the principal leaf spring.

8. In a device of the character described, an oscillatory lever having one end pivotally supported by the axle assembly, a support vertically movable relative to the axle assembly, a connection between the free end of the lever and said support, a spiral compression spring seated upon the lever, a spring hanger having one end pivotally supported by the lever and its free end resiliently supported by said spiral spring, and a connection between said hanger and one end of the principal leaf spring.

9. In a device of the character described, an oscillatory lever having one end pivotally supported by the axle assembly, a support vertically movable relative to the axle assembly, a connection between the free end of the lever and said support, a spring hanger having one end supported by said lever, a spiral compression spring seated upon the lever, a connection between the free end of said hanger and said compression spring so that said free end of said hanger can be moved downwardly against the tension of said compression spring, and a connection between said hanger and one end of the principal leaf spring.

10. In a device of the nature described, a lever, an auxiliary spring carried by the lever intermediate its ends, a spring hanger having one section pivotally supported and having its free section resiliently supported by said auxiliary spring, and a connection between said hanger and one end of the principal leaf spring.

11. The combination with the body, principal leaf spring and the axle assembly of a road vehicle, of an oscillatory lever pivoted at one end to the axle assembly, a support vertically movable relative to said axle assembly, a connection between the free end of the lever and said support, a spring seated upon the lever intermediate its ends, a spring hanger, a connection between one end of said hanger and the lever, a connection between the free end of said hanger and said spring, the arrangement being such that said free end of said hanger can be moved downward against the tension of said spring, and a connection between the free end of said hanger and one end of the principal leaf spring, said principal leaf spring supporting the body of the vehicle.

12. The combination with the body, principal leaf spring and the axle assembly of a road vehicle, of an oscillatory lever pivoted at one end to the axle assembly, a connection between the free end of the lever and the body of the vehicle, a spiral compression spring seated upon the lever intermediate its ends, a spring hanger, a connection between one end of said hanger and said lever, a connection between the free end of the hanger and said compression spring, and a connection between one end of the principal leaf spring and said hanger adjacent its free end, the arrangement being such that said hanger and said compression spring may resiliently support said end of said principal leaf spring.

13. In a spring suspension for road vehicles, an oscillatory lever pivoted at one end to the axle assembly, a support vertically movable relative to the axle assembly, a connection between the free end of the lever and said support, a spiral compression spring seated upon the lever, a spring hanger, a connection between one end of said hanger and said lever, a connection between the free end of said hanger and said spring, the arrangement being such that said free end of said hanger may move downward by compressing said spring.

14. In a spring suspension for road vehicles, an oscillatory lever pivoted at one end to the axle assembly, a vertically movable support for the other end of the lever, a spring hanger, a nonresilient connection between one end of said hanger and said lever and a resilient connection between the other end of said hanger and the lever, and a connection between one end of the principal leaf spring and said hanger.

15. In a spring suspension for road vehicles, an oscillatory lever pivoted at one end to the axle assembly, a vertically movable support for the other end of the lever, a spring hanger, a nonresilient connection between one end of the hanger and said lever, a resilient connection between the other end of the hanger and the lever, and a connection between one end of the principal leaf spring and said hanger adjacent its resiliently supported end, the arrangement being such that said hanger may resiliently support said end of said principal leaf spring.

16. In a spring suspension for road vehicles, an oscillatory lever pivoted at one end to the axle assembly, a support vertically movable relative to the axle assembly, a connection between the free end of the lever and said support, a spring hanger, a nonresilient connection between one end of the hanger and the lever, a resilient connection between the free end of the hanger and said lever, said resilient connection embodying a compression spring carried by the lever, and a connection between one end of the principal leaf spring and said hanger adjacent the free end of the latter.

GEORGE F. VOIGHT.